C. T. MILLER.
CUSHION WHEEL.
APPLICATION FILED FEB. 10, 1915.
1,156,242.
Patented Oct. 12, 1915.
2 SHEETS—SHEET 2.
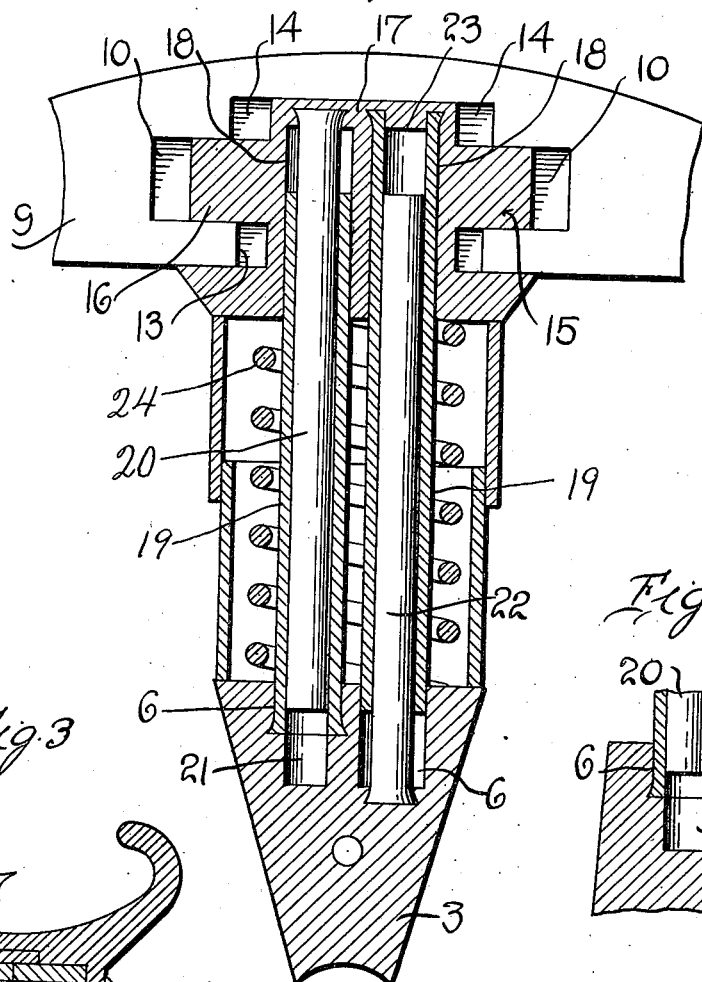
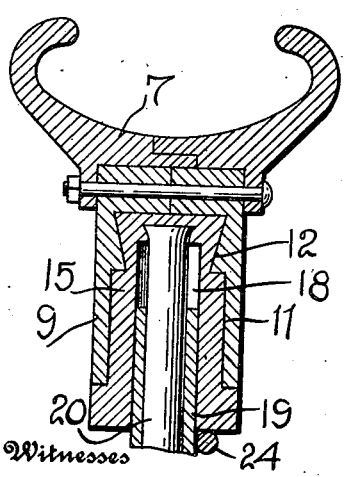
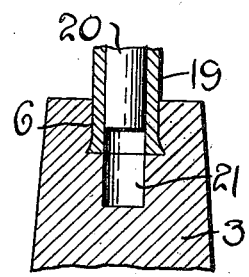
Witnesses
Robert M. Sutphen
A. J. Hind
Inventor
C. T. MILLER
By Watson E. Coleman
Attorney

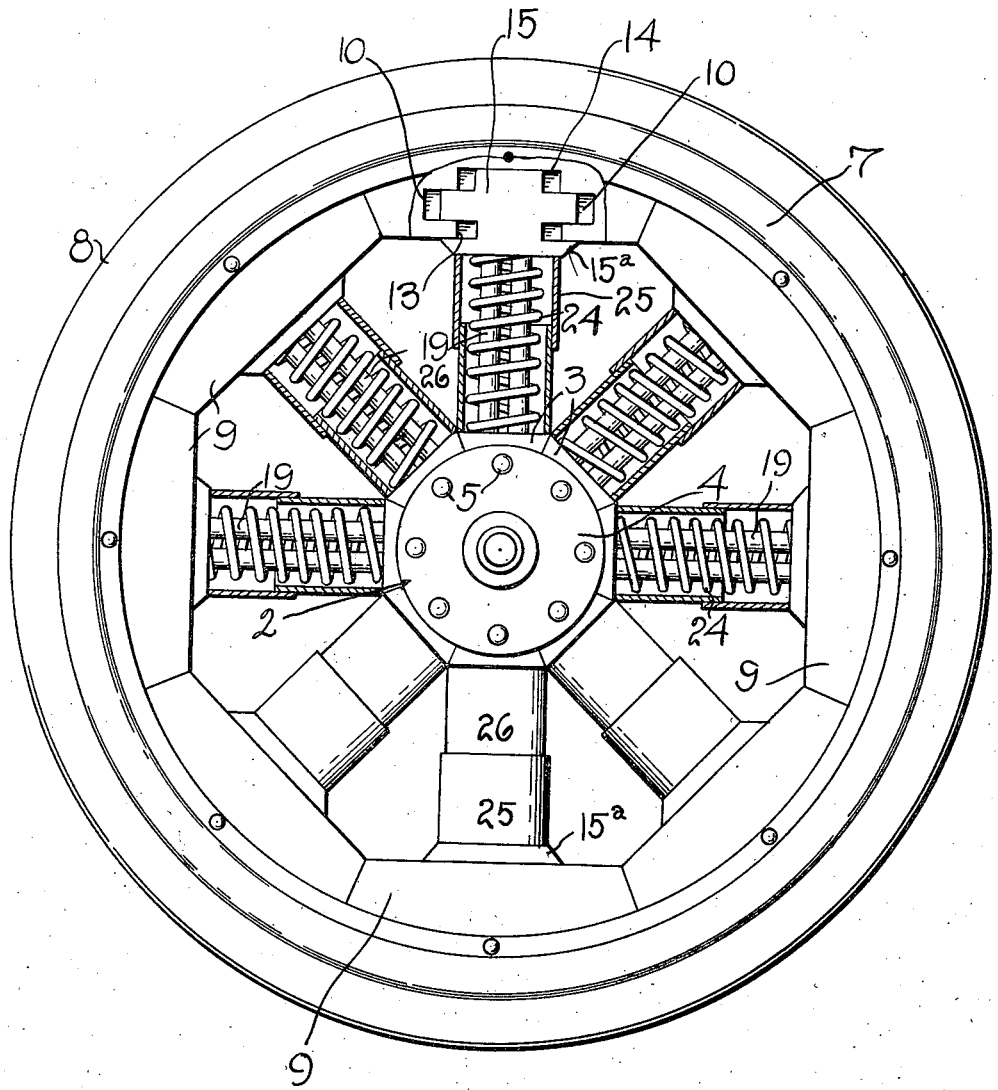

UNITED STATES PATENT OFFICE.

CHARLES T. MILLER, OF MENARD, ILLINOIS.

CUSHION-WHEEL.

1,156,242.

Specification of Letters Patent.  Patented Oct. 12, 1915.

Application filed February 10, 1915. Serial No. 7,333.

*To all whom it may concern:*

Be it known that I, CHARLES T. MILLER, a citizen of the United States, residing at Menard, in the county of Randolph and State of Illinois, have invented certain new and useful Improvements in Cushion-Wheels, of which the following is a specification, reference being had to the accompanying drawings.

My invention relates to vehicle wheels, and particularly to cushioning wheels peculiarly adapted to automobiles.

The primary object of my invention is to provide a vehicle wheel in which a rim or felly section shall be yieldingly engaged with the hub section, provision being made for cushioning movement of the hub or rim relative to each other so as to do away with the necessity of using pneumatic tires, but on the contrary permit a solid tire to be used, thus eliminating a great source of expense to automobile owners.

A further object of the invention is to provide a wheel of the character above stated with both pneumatic and cushioning means, and also to provide means for cushioning the spokes relative to the rim so as to prevent a circumferential movement of the rim or any part thereof from deflecting the spokes and placing them under breaking strain.

Other objects will appear in the course of the following description.

My invention is illustrated in the accompanying drawings, wherein—

Figure 1 is a side elevation of a wheel constructed in accordance with my invention; Fig. 2 is a fragmentary section through one of the felly sections, one of the hub sections and the compound spokes; Fig. 3 is a fragmentary radial section through the felly and one of the spoke sections; Fig. 4 is a fragmentary detail section of a portion of one of the hub sections and the connected spoke, taken on a plane at right angles to the plane of Fig. 2.

Referring to these drawings, 2 designates generally the hub of a vehicle, which is preferably composed of a plurality of segmental members 3 which are held in proper relative position by means of laterally disposed plates 4 through which bolts 5 pass, these bolts passing through the segmental sections 3. Each of these segmental sections is formed with parallel bores 6 which may be said to extend approximately radially to the axial center of the wheel.

The rim 7 may be made of any suitable material and is adapted to engage with and support a tire 8 which, as before stated, is preferably solid. Disposed around the inside of the rim and connected thereto in any suitable manner are a plurality of felly sections 9. These are preferably formed in halves. The sections 9 of the felly abut against each other at their ends these ends being cut on an incline to permit this. There are as many felly sections 9 as there are hub sections 3. Each section 9 is formed with a recess 10, the inner faces of the side walls of this recess being channeled or cut away as at 11 inward of the outer edge face of the sections, and these inner walls adjacent the inner end of the recesses are cut away as at 12 whereby to form a dove-tailed termination for the recess.

Viewed in longitudinal section, as illustrated in Fig. 2 it will be seen that the recess 10 has a relatively contracted mouth 13 opening upon the inner face of the felly section and that the recess is formed with an outward extension 14 less in length than the body of the recess. It is the side walls of this extension 14 which are inclined as at 12.

Disposed within each recess 10 is a slide 15. This slide has a relatively long portion 16 which fits within the body of the recess and within the channel 11 and is longitudinally movable therein, and an extension 17 which fits within the extension 14 of the recess and is longitudinally movable therein, this extension 17 having outwardly inclined side faces, as clearly illustrated in Fig. 3. The slide 15 has a portion 15ᵃ extending laterally upon the face of the corresponding felly section, having sliding engagement therewith and carrying the incasing section 25. It will be seen that the slide 15 is shorter than the body of the recess and that the extension 17 is shorter than the extension 14 of the recess, so that the slide may have a limited longitudinal movement.

The inner face of each slide is formed with two bores 18 which correspond to and confront the bore 6 formed in the corresponding section 3. Disposed in each of these bores 6 and 18 is a tubular spoke section 19. These tubular spoke sections are shorter than the distance between the bottom of the bore 18 and the bottom of the corresponding bore 6, and preferably one of these spoke sections 19 is disposed with its end resting against the bottom of one of the bores 6 while the other spoke section 19 is disposed with one end resting against the bottom of the corresponding bore 18. Thus these tubular spoke sections are arranged in staggered relation to each other and an air space is left between one of the tubular sections and the bottom of the bore 18 and between the other tubular section and the bottom of the bore 6.

Mounted upon the slide 17 is a central spoke section constituting a piston designated 20, which projects into the corresponding tubular spoke section 19 but is sufficiently short as to leave an air space 21 at the inner end of the piston 20. Attached to the section 3 is an outwardly projecting spoke section 22 which constitutes a piston and which is sufficiently short as to leave an air space 23 within the corresponding bore 18. Surrounding both of these compound spokes and adapted to be placed under compression by a movement of the hub toward the rim is a helical spring 24. It will of course be understood that each one of the spokes is constructed in the manner described, that is, that each one consists of two compound spokes surrounded by a helical spring 24. For the purpose of incasing the cushioning members heretofore described, I provide a casing which is formed in two sets of sections. The section 25 is attached to a slide and the section 26 is attached to a hub section and these sections 25 and 26 have telescopic or sliding engagement with each other to permit the inward movement of the felly or rim relative to the hub.

The operation of my invention will be obvious from what has gone before. Under a load which would cause a depression of the hub relative to the rim the hub will lower and in so doing the compound pistons formed by the members 21 and 22 and 19 will act to compress the air in the bores 18 and 6 at the ends of these members, thus cushioning the movement of the hub relative to the rim, and this movement of the hub relative to the rim will be further resisted by the springs 24. The spokes which are horizontal when the vertical spokes are reduced in length or increased in length by the depression of the hub relative to rim will move downward with the hub and will also move downward with relation to the rim because of the slides 15 which will be free to move relative to the rim to a limited distance. Furthermore, these slides permit the rim of the wheel to yield on striking an obstruction and thus relieve the spokes from shock.

While I have illustrated what I believe to be the best form of my invention, I do not wish to be limted thereto, as it is obvious that many changes might be made in the construction without departing from the spirit thereof.

It will be obvious that with this construction should any one spoke or pair of spokes become damaged they can be readily removed and replaced by removing the hub and felly sections connected with the spokes. As constructed, the wheel is supported against lateral strain by reason of the engagement of the rim section of the casing with the hub section thereof, thus taking the lateral strain off the spokes. The parts are entirely inclosed and thus protected from dirt or dust and the arrangement is of such simplicity that the parts will not readily get out of order.

Having described my invention, what I claim is:

1. In cushion wheel, a hub, a rim including a plurality of felly sections, each felly section being formed with a longitudinally extending recess, having a relatively contracted mouth open upon the inner face of the section, a slide disposed in each recess but shorter than the recess and having longitudinal movement therein and acting to compress the air in the recess upon such a longitudinal movement, a telescopic spoke connecting the hub to the slide, and a spring bearing against the hub surrounding said spoke and bearing against the corresponding slide.

2. A cushion wheel comprising a hub, a rim including a plurality of felly sections carried upon the inner face of the rim, each of said sections having a longitudinally extending recess having a relatively contracted mouth opening toward the hub, a slide mounted in each of the recesses but shorter than the corresponding recess adapted to compress the air in said recess upon a movement of the slide in either direction, said slide being formed upon its inner face with a pair of bores, the hub being formed upon its outer face with a corresponding pair of bores, tubular spoke members, one mounted in the bore of the hub and extending partly into the corresponding bore of the slide and the other mounted in the other bore of the slide and extending partly into the corresponding bore of the hub, spoke members constituting pistons, one extending from the slide into the corresponding tubular spoke member and the other extending from the hub into the corresponding spoke member, and springs each surrounding each pair of telescopic spoke members and resisting inward movement of the rim relative to the hub.

3. In a cushion wheel, a hub and a rim, a plurality of pairs of tubular spoke members, one spoke member of each pair being mounted in the hub and the other in the rim, a plurality of pairs of spoke members constituting pistons, one member of each pair extending from the rim into the corresponding tubular spoke member extending from the hub and the other extending from the hub into the corresponding tubular spoke member extending from the rim, and resilient means resisting inward movement of the rim relative to the hub.

In testimony whereof I hereunto affix my signature in the presence of two witnesses.

CHARLES T. MILLER.

Witnesses:
 WM. ASZMAN,
 CHAS. H. GNAEGY.